United States Patent
Brinkmann

(10) Patent No.: US 12,026,320 B2
(45) Date of Patent: Jul. 2, 2024

(54) COMBINATION OF AN INPUT DEVICE AND A SET OF SUPPORT ELEMENTS

(71) Applicant: 360 Service Agency GmbH, Freiburg (DE)

(72) Inventor: Tobias Brinkmann, Freiburg (DE)

(73) Assignee: 360 Service Agency GmbH, Freiburg (DE)

( * ) Notice: Subject to any disclaimer, the term of this patent is extended or adjusted under 35 U.S.C. 154(b) by 0 days.

(21) Appl. No.: 17/012,569

(22) Filed: Sep. 4, 2020

(65) Prior Publication Data
US 2021/0072839 A1 Mar. 11, 2021

(30) Foreign Application Priority Data

Sep. 6, 2019 (NL) ..................................... 2023793
Mar. 3, 2020 (NL) ..................................... 2025036

(51) Int. Cl.
*G06F 3/02* (2006.01)
*A63F 13/24* (2014.01)

(52) U.S. Cl.
CPC ............ *G06F 3/0202* (2013.01); *A63F 13/24* (2014.09); *G06F 3/0208* (2013.01); *G06F 3/0219* (2013.01)

(58) Field of Classification Search
CPC .... G06F 3/0202; G06F 3/0208; G06F 3/0219; G06F 3/021; G06F 3/0216; A63F 13/24; H01H 13/86; H01H 2223/016
See application file for complete search history.

(56) References Cited

U.S. PATENT DOCUMENTS

| | | | |
|---|---|---|---|
| 2002/0003197 A1* | 1/2002 | MacEachern | F16M 11/10 248/188.2 |
| 2013/0299326 A1* | 11/2013 | Hsu | G06F 3/0221 200/5 A |
| 2018/0050546 A1* | 2/2018 | Kubota | G06F 3/0219 |

OTHER PUBLICATIONS

Tamar Weinber, DIY Magnetic Doorstop Laptop Stand, Published Feb. 17, 2008 Retrieved from the internet (Dec. 8, 2022) URL: https://lifehacker.com/diy-magnetic-doorstop-laptop-stand-356857 (Year: 2008).*

* cited by examiner

*Primary Examiner* — Amit Chatly
(74) *Attorney, Agent, or Firm* — Schroeder Law PC

(57) ABSTRACT

The invention relates to a combination of an input device for a computing device and a set of support elements, wherein the set of support elements includes at least two support elements, wherein the combination includes fasteners to fasten any number of support elements of the set of support elements to the input device, wherein the support elements are fastenable to the input device at a location on the input device to set a tilt angle of the input device, and wherein the set of support elements is configured such that a single support element can be fastened to the input device and such that a plurality of support elements can be fastened to the input device as a stack of support elements thereby allowing to set different tilt angles of the input device.

8 Claims, 8 Drawing Sheets

COMBINATION OF AN INPUT DEVICE AND A SET OF SUPPORT ELEMENTS

BACKGROUND OF THE INVENTION

The invention relates to input devices for computing devices, e.g. computers, such as a keyboard.

The keyboard is an example of a character input device including a housing and a plurality of buttons or keys for interacting with the fingers of a user, which buttons or keys are associated with at least one character and an electronic module accommodated by the housing for converting the interaction with a button or key into coded form and for transmitting the coded form as user input to a computing device.

Keyboards are used by regular users for work and home related activities, such as reading and drafting documents and e-mails, etc. However, such input devices are also used for gaming purposes. With the increased professionalization of the gaming industry, the demands with respect to the input devices also increased. Hence, it is customary now to personalize the input devices to a high degree allowing to optimize the gaming experience or to increase the performance.

SUMMARY OF THE INVENTION

In view of the above it is an object of the invention to provide an input device that allows a high degree of personalization and flexibility.

According to the invention, there is provided a combination of an input device for a computing device and a set of support elements, wherein the set of support elements includes at least two support elements, wherein the combination includes fasteners to fasten any number of support elements of the set of support elements to the input device, wherein the support elements are fastenable to the input device at a location on the input device to set a tilt angle of the input device, and wherein the set of support elements is configured such that a single support element can be fastened to the input device and such that a plurality of support elements can be fastened to the input device as a stack of support elements thereby allowing to set different tilt angles of the input device.

In an embodiment, the input device is a keyboard or an extension unit for a keyboard, e.g. as will be described below in more detail.

In an embodiment, the set of support elements comprises a support element of type "a" which is configured to engage with a support surface, e.g. a table surface.

In an embodiment, the set of support elements comprises at least one support element of type "b" configured to be arranged in the stack of support elements between the input device and the support element of type "a".

In an embodiment, the fasteners include a permanent magnet. However, other fasteners, such as snap-fit connectors, Velcro, a bayonet connection or a bolt are also envisaged.

In an embodiment, the set of support elements is a first set of support elements and the fasteners are first fasteners, wherein the combination further includes a second set of support elements, wherein the second set of support elements includes at least two support elements, wherein the combination includes second fasteners to fasten any number of support elements of the second set of support elements to the input device, wherein the support elements of the second set of support elements are fastenable to the input device at a location on the input device to set a tilt angle of the input device, and wherein the second set of support elements is configured such that a single support element can be fastened to the input device and such that a plurality of support elements can be fastened to the input device as a stack of support elements thereby allowing to set different tilt angles of the input device using the first and second set of support elements.

In an embodiment, the input device, e.g. the keyboard, includes an attachment location per set of support elements.

In an embodiment, the input device is a combination of a computer keyboard and an extension unit for providing user input to a computing device, e.g. a computer, wherein preferably the keyboard comprises:
a housing;
buttons and/or keys held by the housing;
an electronic module accommodated inside the housing to convert engagement with a button or key into coded form and to transmit the coded form to the computing device as user input,
wherein preferably the extension unit comprises:
a housing;
a button and/or key held by the housing;
an electronic module accommodated inside the housing to convert engagement with a button or key into coded form and to transmit the coded form to the electronic module of the keyboard for further transmittal to the computing device as user input,
and wherein preferably the keyboard and the extension unit are configured to releasably attach the housing of the extension unit to the housing of the keyboard at a plurality of different locations.

An advantage of the combination is that the extension unit is attached to the housing of the keyboard and thus the extension unit after being attached to the keyboard forms an integral part thereof and the combination can be handled as a single unit during for instance gaming. The plurality of different locations to attach the extension unit allows to find an optimal location for a user or specific game.

In an embodiment, the housing of the keyboard includes electric connectors at the plurality of different locations to mate with a corresponding electric connector provided on the housing of the extension unit. The electric connectors on the keyboard may be of the female type and the electric connector on the extension unit may be of the male type, but the other way around or other electric connectors such as pogo pins may also be used.

In an embodiment, the housing of the keyboard includes a permanent magnet or ferromagnetic material associated with each location, wherein the housing of the extension unit includes a permanent magnet or ferromagnetic material to cooperate with the permanent magnet or ferromagnetic material at a location to attach the extension unit to the keyboard using magnetic forces.

In an embodiment, the housing of the extension unit includes a T-, L- or U-shape configured to be arranged on or around an edge of the housing of the keyboard.

In an embodiment, the electric connector and/or the permanent magnet or ferromagnetic material (if present) are arranged at a bottom of the U-shape or form a leg of the T-, L- or U-shape.

In an embodiment, the U-shape is configured to be clamped around the edge of the housing of the keyboard. The clamping engagement may be combined with the magnetic attachment described above. The magnetic attachment may then be used to align the extension unit with the keyboard to easily find the correct attachment location and the clamping engagement provided additional resistance against unwanted release of the extension unit.

In an embodiment, the electronic module of the extension unit and the electronic module of the keyboard are configured to wirelessly communicate with each other, e.g. using Bluetooth, Wi-Fi, radio waves, infrared, etc.

In an embodiment, the keyboard includes a left side and a right side opposite the left side, wherein the extension unit includes a left side and a right side opposite the left side, and wherein the extension unit and keyboard are configured to allow attachment of the left side of the extension unit to the right side of the keyboard and to allow attachment of the right side of the extension unit to the left side of the keyboard.

In an embodiment, the extension unit includes an attachment device at the right side of the extension unit and an attachment device at the left side of the extension unit, wherein each attachment device is moveable between an operational position in which the extension unit can be attached to the keyboard using the attachment device and a retracted position in which the attachment device is prevented from engaging with the keyboard.

In an embodiment, an attachment device does not extend beyond the housing of the extension unit in the retracted position.

In an embodiment, the attachment device at the right side is coupled to the attachment device at the left side so that an operational position of the attachment device at the right side corresponds to the retracted position of the attachment device at the left side and the operational position of the attachment device at the left side corresponds to the retracted position of the attachment device at the right side.

In an embodiment, the coupled attachment devices also have an intermediate position in which both attachment devices are prevented from engaging with the keyboard, and in which preferably the attachment devices both do not extend beyond the housing of the extension unit.

In an embodiment, the extension unit is a numeric keypad, a multimedia control unit, and/or a display unit.

In an embodiment, the plurality of locations to attach the extension unit to the keyboard are located at a top and/or bottom side of the keyboard.

In an embodiment, the input device is an extension unit for a keyboard, comprising:
  a housing;
  a button and/or key held by the housing;
  an electronic module accommodated inside the housing to convert engagement with a button or key into coded form and to transmit the coded form to the electronic module of the keyboard for further transmittal to the computing device as user input,
  wherein the keyboard and the extension unit are configured to releasably attach the housing of the extension unit to the housing of the keyboard at a plurality of different locations,
  wherein the housing of the extension unit preferably includes a permanent magnet or ferromagnetic material to cooperate with a permanent magnet or ferromagnetic material on the keyboard to attach the extension unit to the keyboard using magnetic forces,
  wherein the housing of the extension unit preferably includes a T-, L- or U-shape configured to be arranged on or around an edge of the keyboard,
  and wherein preferably, in case a U-shape is applied, the U-shape is configured to be clamped around the edge of the housing of the keyboard.

In an embodiment, the input device is an extension unit for a keyboard, comprising:
  a housing;
  a button and/or key held by the housing;
  an electronic module accommodated inside the housing to convert engagement with a button or key into coded form and to transmit the coded form to the electronic module of the keyboard for further transmittal to the computing device as user input,
  wherein the keyboard and the extension unit are configured to releasably attach the housing of the extension unit to the housing of the keyboard at a plurality of different locations,
  wherein the extension unit includes a left side and a right side opposite the left side, and wherein the extension unit is configured to allow attachment of the left side of the extension unit to a right side of the keyboard and to allow attachment of the right side of the extension unit to a left side of the keyboard.

In an embodiment, the extension unit includes an attachment device at the right side of the extension unit and an attachment device at the left side of the extension unit,
  wherein each attachment device is moveable between an operational position in which the extension unit can be attached to the keyboard using the attachment device and a retracted position in which the attachment device is prevented from engaging with the keyboard.

In an embodiment, an attachment device does not extend beyond the housing of the extension unit in the retracted position.

In an embodiment, the attachment device at the right side is coupled to the attachment device at the left side so that an operational position of the attachment device at the right side corresponds to the retracted position of the attachment device at the left side and the operational position of the attachment device at the left side corresponds to the retracted position of the attachment device at the right side.

In an embodiment, the coupled attachment devices also have an intermediate position in which both attachment devices are prevented from engaging with the keyboard, and in which preferably the attachment devices both do not extend beyond the housing of the extension unit.

In an embodiment, the extension unit is a numeric keypad, a multimedia control unit and/or a display unit.

The invention also relates to a set of support elements for an input device, wherein the set of support elements includes at least two support elements and fasteners to fasten any number of support elements of the set of support elements to the input device, wherein the support elements are fastenable to the input device at a location on the input device to set a tilt angle of the input device, and wherein the set of support elements is configured such that a single support element can be fastened to the input device and such that a plurality of support elements can be fastened to the input device as a stack of support elements thereby allowing to set different tilt angles of the input device.

Features and embodiments described above relating to the set of support elements may also apply and will not be unduly repeated here.

BRIEF DESCRIPTION OF THE DRAWINGS

The invention will now be described in a non-limiting way with reference to the accompanying drawings in which like parts are indicated by like reference symbols, and in which.

DETAILED DESCRIPTION OF THE INVENTION

Figure 1:
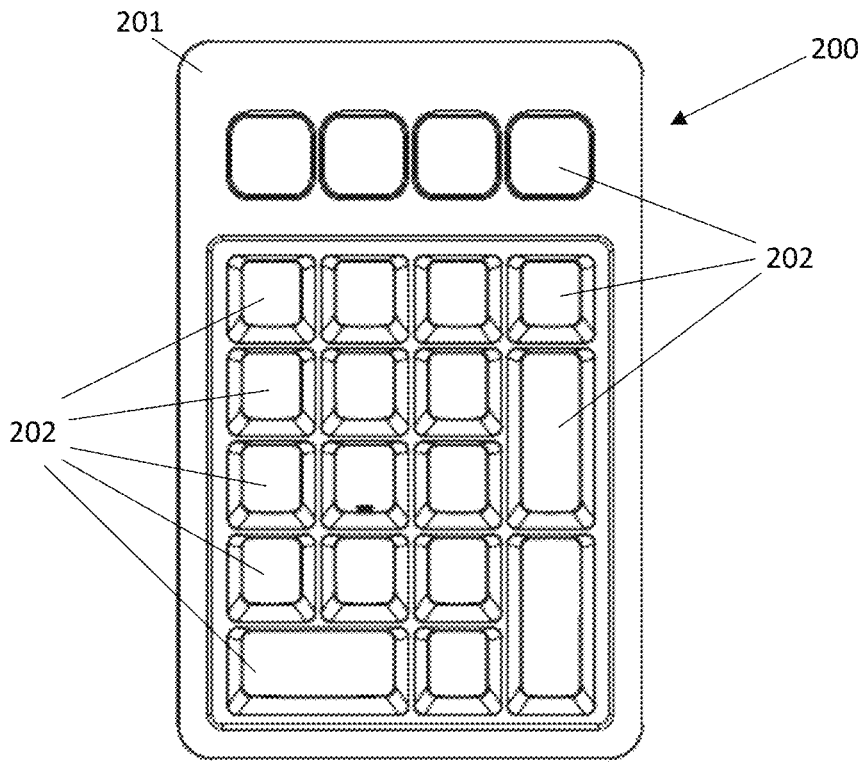
FIG. 1 schematically depicts a top view of an extension unit according to the invention.
Figure 2:
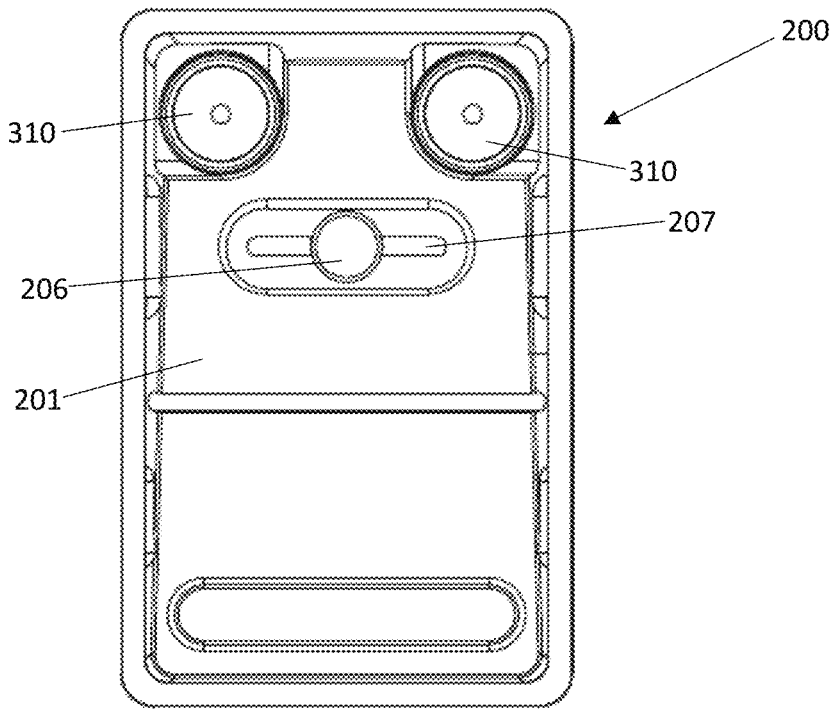
FIG. 2 schematically depicts a bottom view of the extension unit of FIG. 1.
Figure 3:
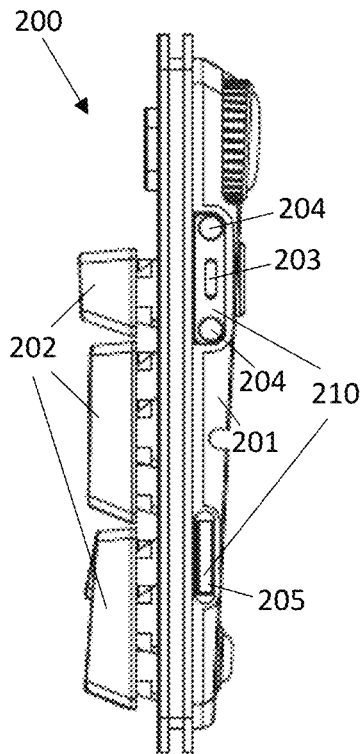
FIG. 3 schematically depicts a side view of the extension unit of FIG. 1.
Figure 4:
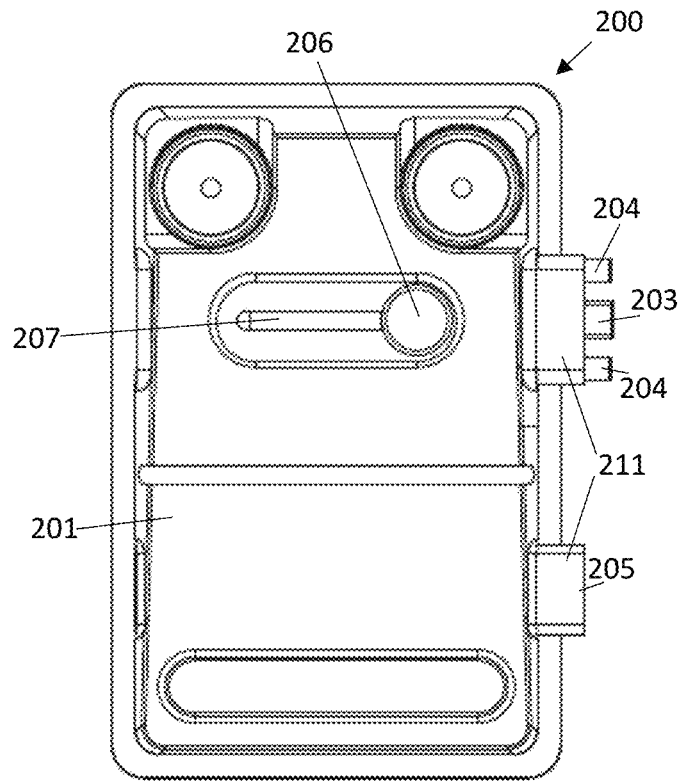
FIG. 4 schematically depicts a bottom view of the extension unit of FIG. 1 with the left attachment device in the operational position.
Figure 5:
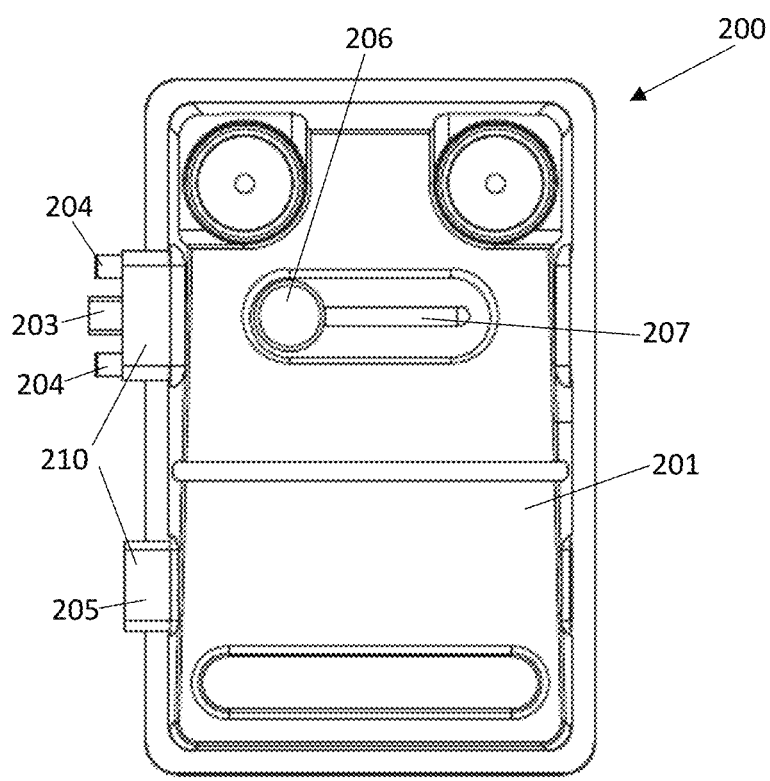
FIG. 5 schematically depicts a bottom view of the extension unit of FIG. 1 with the right attachment device in the operational position.

FIGS. 1-5 schematically depict an extension unit 200 according to an embodiment of the invention. FIG. 1 depicts a top view, FIG. 2 depicts a bottom view, FIG. 3 depicts a side view, and FIGS. 4 and 5 depict a bottom view of different configurations of the extension unit 200.

The extension unit 200 comprises a housing 201 and a plurality of keys 202 of which only a limited number of keys are indicated using reference numeral 202. The extension unit 200 in this embodiment is a numerical keypad. Inside the extension unit 200, an electronic module is accommodated to convert engagement of a user with a key 202 into coded format and to transmit the coded form to a keyboard to be transmitted to a computing device, e.g. a computer, as user input.

As the electronic module is accommodated inside the housing 201, the only visible part of the electronic module in this embodiment are two male electric connectors 203 as shown in FIGS. 2 to 4 that are configured to allow communication between the electronic module of the extension unit and an electronic module of a keyboard.

The extension device 200 includes two attachment devices, namely an attachment device 210 at a right side of the extension device 200 and an attachment device 211 at a left side of the extension device 200, where left and right are to be considered in top view of the extension unit 200. Hence, as FIGS. 4 and 5 depict a bottom view, the right-side attachment device 210 is shown on the left and the left side attachment device 211 is shown on the right.

In this embodiment, the right-side attachment device 210 includes a male electric connector 203, two alignment pins 204 and an attachment member 205. The left side attachment device 211 similarly includes a male electric connector 203, two alignment pins 204 and an attachment member 205.

The right-side attachment device 210 and the left side attachment device 211 are connected to each other, so that they are moveable as a single unit. Connected to the single unit is a knob 206 which is slidingly received in a slot 207 in a bottom of the housing 201. The knob 206 allows to manually move the single unit between three distinct positions as explained below. Other manipulation members such as a rib, a larger surface, possibly embodied as rough textured surface, or a pin, etc. are also envisaged as alternative or addition to the knob 206.

In a first position, also referred to as the intermediate position, the knob 206 is positioned halfway the slot 207. The first position is clearly depicted in FIGS. 1 and 2. The intermediate position is characterized in that both the right-side attachment device 210 and the left side attachment device 211 do not extend outside the housing 201 and thus cannot be used to connect the extension unit to a keyboard. This may be beneficial for transport and storage as the connectors and pins are protected inside the housing 201 from being damaged.

In a second position, also referred to as the right attachment position, the knob 206 is positioned at the left side attachment device side of the slot 207 as clearly depicted in FIG. 4 and in which the left side attachment device 211 extends from the housing of the extension device to attach the left side of the extension unit 200 to the right-side of a keyboard. In the second position, the left side attachment device 211 is considered to be in an operational position while the right-side attachment device 210 is considered to be in a retracted position.

In a third position, also referred to as the left attachment position, the knob 206 is positioned at the right-side attachment device side of the slot 207 as clearly depicted in FIG. 5 and in which the right-side attachment device 210 extends from the housing of the extension device to attach the right-side of the extension unit 200 to the left side of a keyboard. In the third position, the left side attachment device 211 is considered to be in a retracted position while the right-side attachment device 210 is considered to be in an operational position.

Figure 6:
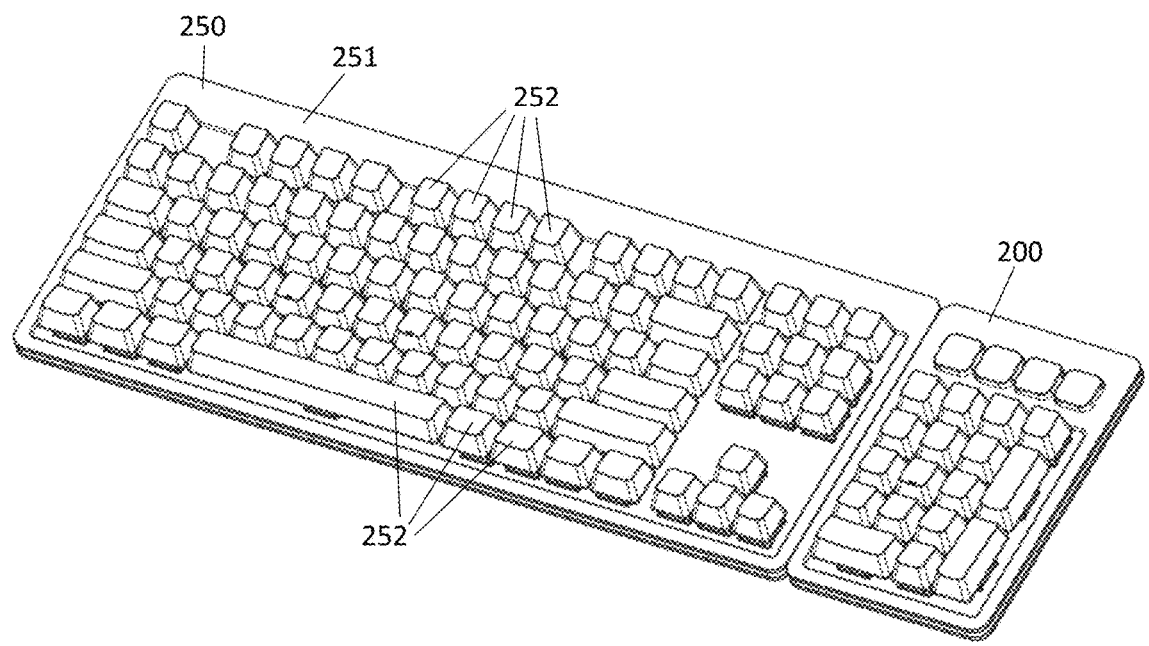
FIG. 6 schematically depicts a perspective top view of a combination of a keyboard and the extension unit of FIG. 1 with the left side of the extension unit attached to the right side of the keyboard.
Figure 7:
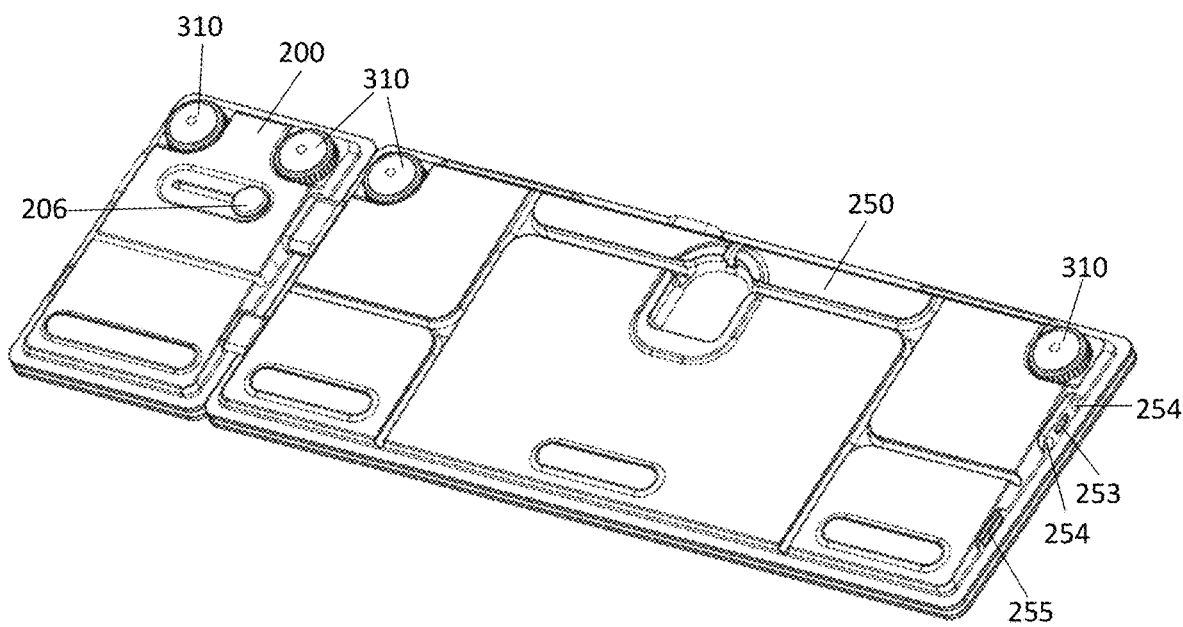
FIG. 7 schematically depicts a perspective bottom view of the combination of FIG. 6.

FIGS. 6 and 7 schematically depict a combination of a keyboard 250 and the extension unit 200 connected to a right side of the keyboard and thus with the attachment devices 210 and 211 in the right attachment position. FIG. 6 depicts a perspective top view and FIG. 7 depicts a perspective bottom view.

The keyboard 250 includes a housing 251, a plurality of keys 252 (of which only a limited number of keys are denoted using reference numeral 252), and an electronic module accommodated by the housing 251 and configured to convert engagement with a key 252 into coded form and to transmit the coded form to a computing device, e.g. a computer, as user input. The keyboard 250 may be connected to the computer via a wire or wirelessly as is known in the art.

For the keyboard, references to the left and right side of the keyboard should be interpreted in the top view of the keyboard. Hence, FIG. 7 shows the left side of the keyboard 250 on the right side of the drawing. The left side of the keyboard 250 is provided with a female electric connector 253 to cooperate with the male electric connector 203 of an extension unit, two alignment holes 254 to receive the alignment pins 204 of an extension unit, and an attachment member 255 to mate with the attachment member 205 of an extension unit. The same components are provided on the right side of the keyboard 250 to attach the extension unit 200 to the keyboard 250.

Of course, the male and female connectors could be interchanged as well or replaced by pogo pins or other electric connectors. It may be envisaged that the keyboard 250 includes one or more rails in or along the edge to engage with corresponding electric connectors of the extension unit. This has the advantage that no distinct attachment locations are provided but the extension unit is able to electrically connect at any location along the rail. The same advantage may be obtained using a wireless connection method. The same principle may be obtained by providing a magnetic rail or a rail of ferromagnetic material to attach the extension unit at any location along the rail.

Figure 8:
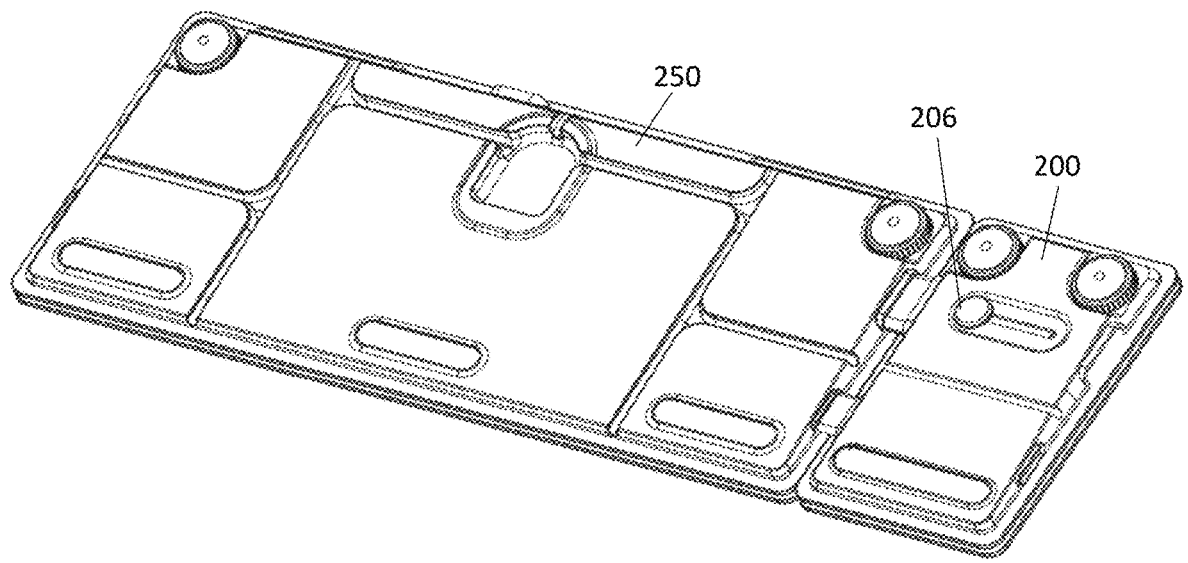
FIG. 8 schematically depicts a perspective bottom view of the combination of FIG. 6, but now with the right side of the extension unit being attached to the left side of the keyboard.

FIG. 8 depicts a perspective bottom view of the combination of FIGS. 6 and 7, but now with the extension unit 200 being connected to the left side of the keyboard 250 and thus the attachment devices in the left attachment position.

The alignment pins 204 on the extension unit and the alignment holes 254 on the keyboard allow the male and female connectors to easily mate with each other and also prevents the application of a too large load to the electric connectors which could lead to damage and/or a loss in communication. However, it is also envisaged that no electric connectors are used and that communication between the electronic module of the extension unit and the electronic module of the keyboard is wireless.

The alignment pins 204 may be frictionally engage with the alignment holes 254, but alternatively, the alignment pins 204 and alignment holes 254 may include magnetic and/or magnetizable material to apply magnetic forces between the keyboard and the extension unit.

The attachment members 205 and 255 may be connected to each other using magnetic forces as well.

Figure 9:
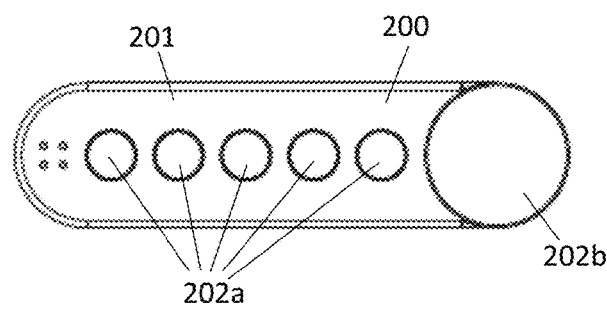
FIG. 9 schematically depicts a top view of an extension unit according to another embodiment of the invention.
Figure 10:
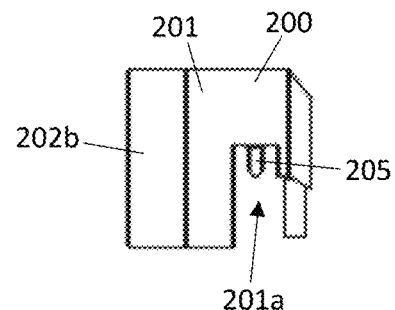
FIG. 10 schematically depicts a side view of the extension unit of FIG. 9.
Figure 11:
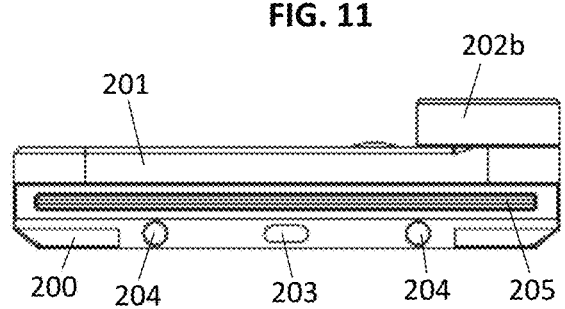
FIG. 11 schematically depicts a front view of the extension unit of FIG. 9.
Figure 12:
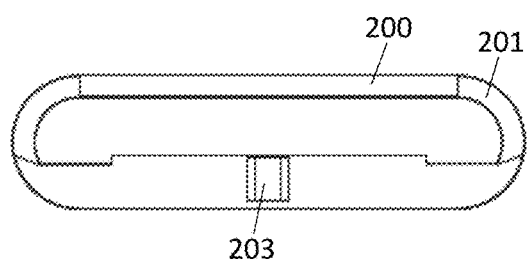
FIG. 12 schematically depicts a bottom view of the extension unit of FIG. 9.

FIGS. 9-12 schematically depict an extension unit 200 according to another embodiment of the invention. FIG. 9 depicts a top view, FIG. 10 depicts a side view, FIG. 11 depicts a front view and FIG. 12 depicts a bottom view.

The extension unit 200 includes a housing 201 and a plurality of knobs 202a, 202b held by the housing 201, wherein the knobs 202a can be pressed and the knob 202b may be turned and/or pressed.

The housing 201 accommodates an electronic module configured to convert engagement with a knob, alternatively referred to as a key, into coded form and transmit the coded form to an electronic module of a keyboard for further transmittal to a computing device as user input.

The housing 201 includes a U-shaped recess 201a as can be best seen in FIG. 10, with a bottom of the U-shape containing an attachment member 205 configured to engage with an edge of a keyboard for preferably a clamping engagement. One leg of the U-shape supports the knobs 202a, 202b, while the other leg of the U-shape supports a male electric connector 203 and magnetic attachment members 204 for cooperation with a female electric connector and magnetic attachment members on the keyboard, respectively.

Figure 13:
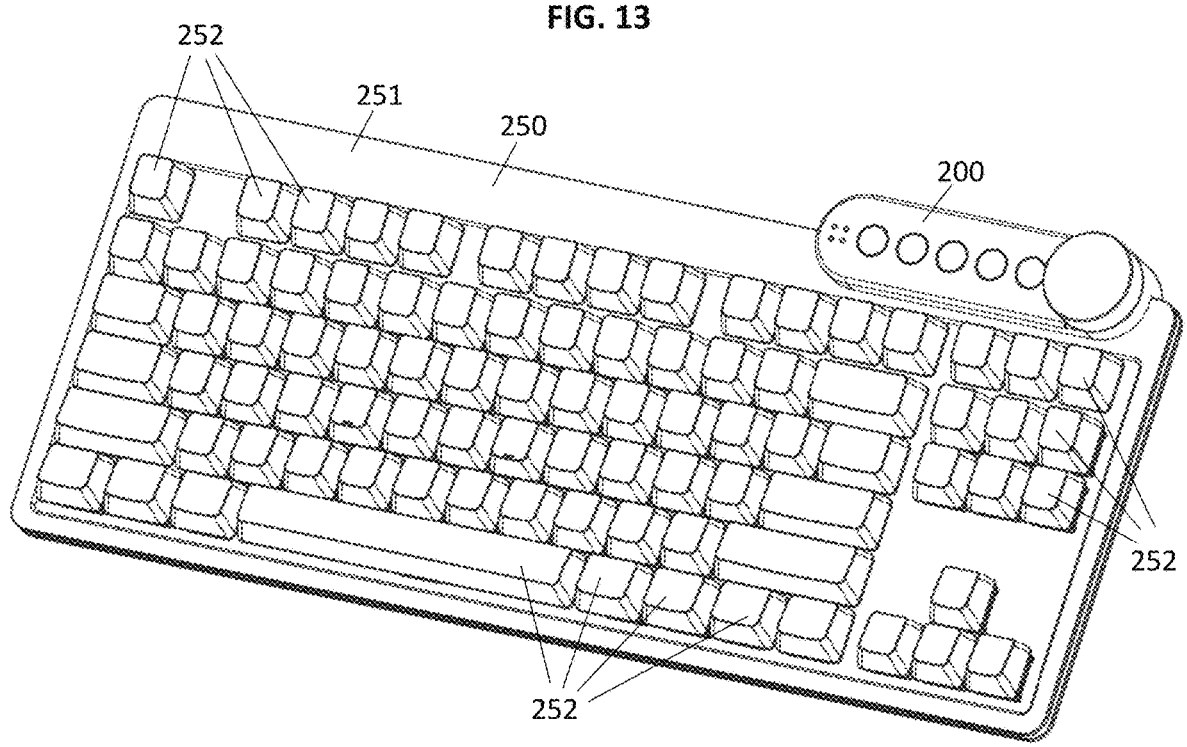
FIG. 13 schematically depicts a perspective top view of a combination of a keyboard and the extension unit of FIG. 9.
Figure 14:
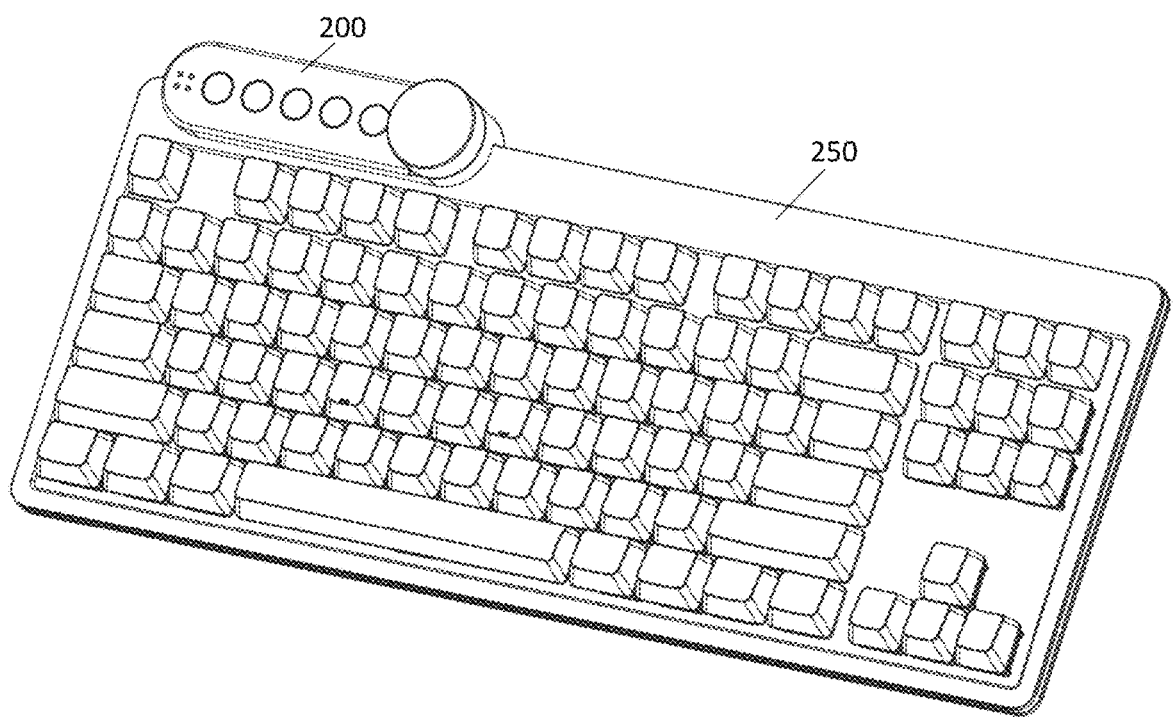
FIG. 14 schematically depicts a perspective top view of the combination of FIG. 13 with the extension unit attached at another location.

FIGS. 13 and 14 schematically depict a combination of a keyboard 250 and the extension unit 200 of FIGS. 9-12. The keyboard includes a housing 251, a plurality of keys 252 (of which only a limited number of keys are denoted using reference numeral 252), and an electronic module accommodated by the housing 251 and configured to convert engagement with a key 252 into coded form and to transmit the coded form to a computing device, e.g. a computer, as user input. The keyboard 250 may be connected to the computer via a wire or wirelessly as is known in the art.

Figure 15:
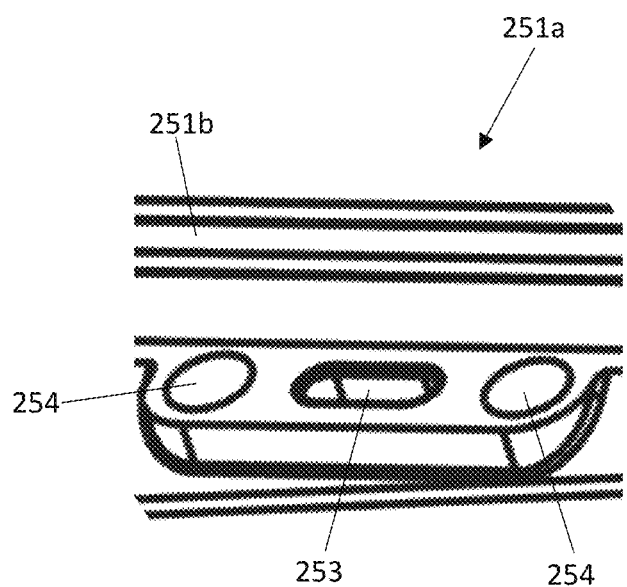
FIG. 15 schematically depicts a detailed view of an attachment location on a keyboard suitable to connect the extension unit of FIG. 1 or the extension unit of FIG. 9.

The keyboard 250 contains multiple locations including a female electric connector and magnetic attachment members for cooperation with the extension unit to allow the extension unit to be attached at different locations to the keyboard. FIG. 15 depicts a detail of such a location clearly showing a female electric connector 253 and the magnetic attachment members 254. Also shown is an edge 251a of the housing of the keyboard around which the U-shaped recess of the housing of the extension unit can be arranged. The edge 251a of the housing includes a recess 251b allowing to receive the attachment member 205 arranged at the bottom of the U-shaped recess of the extension unit 200 thereby providing a clamping engagement between the extension unit 200 and the keyboard.

FIG. 13 shows the extension unit attached near an upper right corner of the keyboard while FIG. 14 shows the extension unit attached near an upper left corner of the keyboard. However, it may well be possible to connect the extension unit to the left or right side of the keyboard as well. In fact, there may be an embodiment in which the extension unit can be connected to the upper side and/or the right side and/or the left side and/or the bottom side, e.g. along the entire perimeter of the keyboard.

In an embodiment, the right and left side of the keyboard and the extension units described herein may be configured such that both the extension unit of FIG. 9 and the extension unit of FIG. 1 can be attached to the same keyboard providing flexible extensions to the keyboard depending on the requirements of the task performed with the keyboard.

Figure 16:
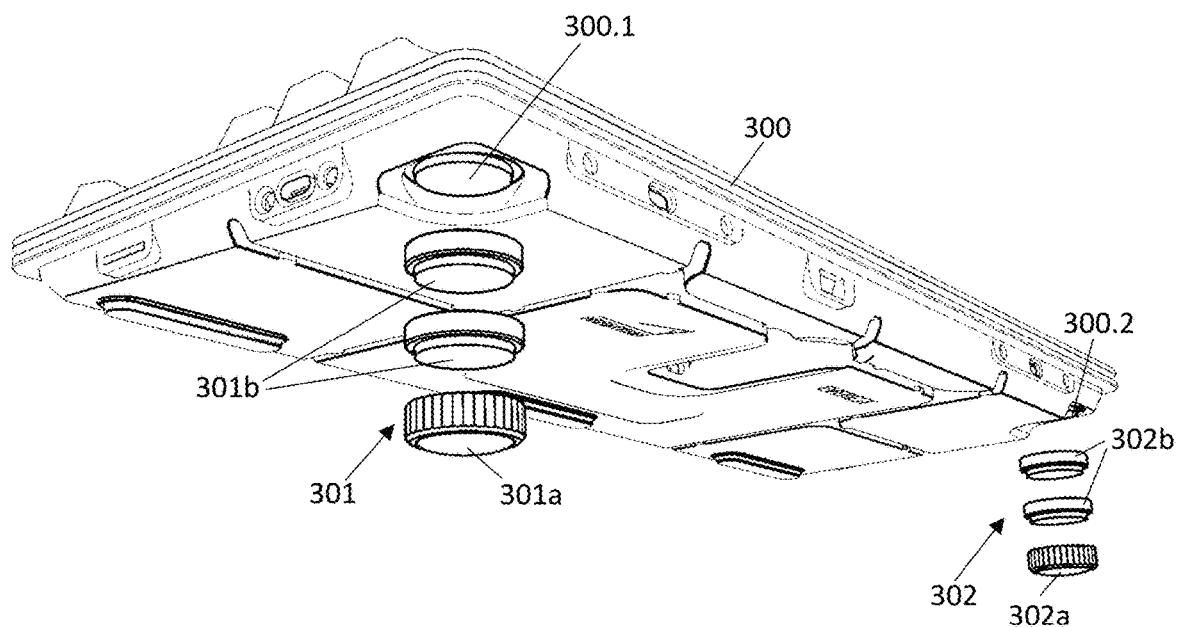
FIG. 16 schematically depicts an exploded perspective view of an embodiment of a combination of a keyboard and two sets of support elements according to the invention.
Figure 17:
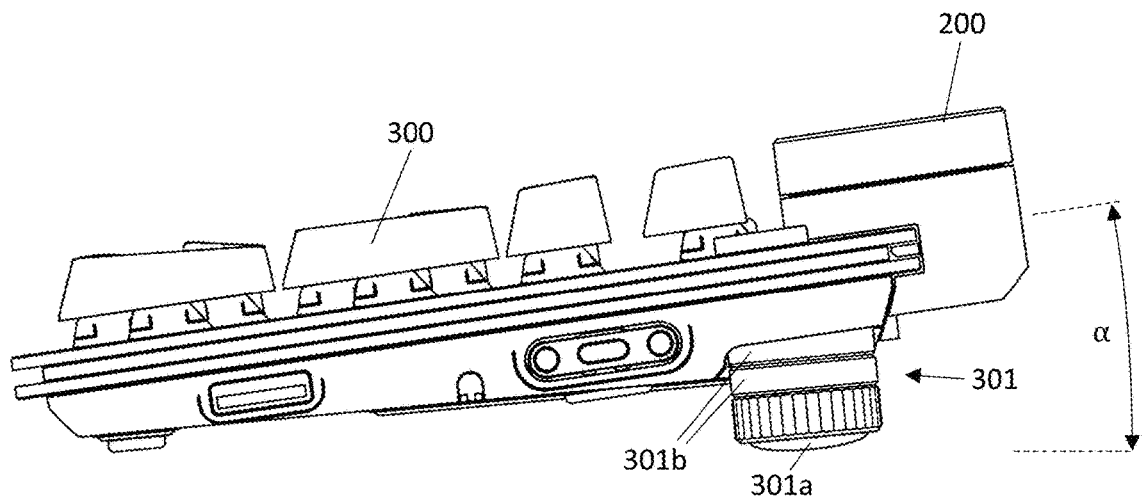
FIG. 17 schematically depicts a side view of the combination of FIG. 16 at a first tilt angle of the keyboard.
Figure 18:
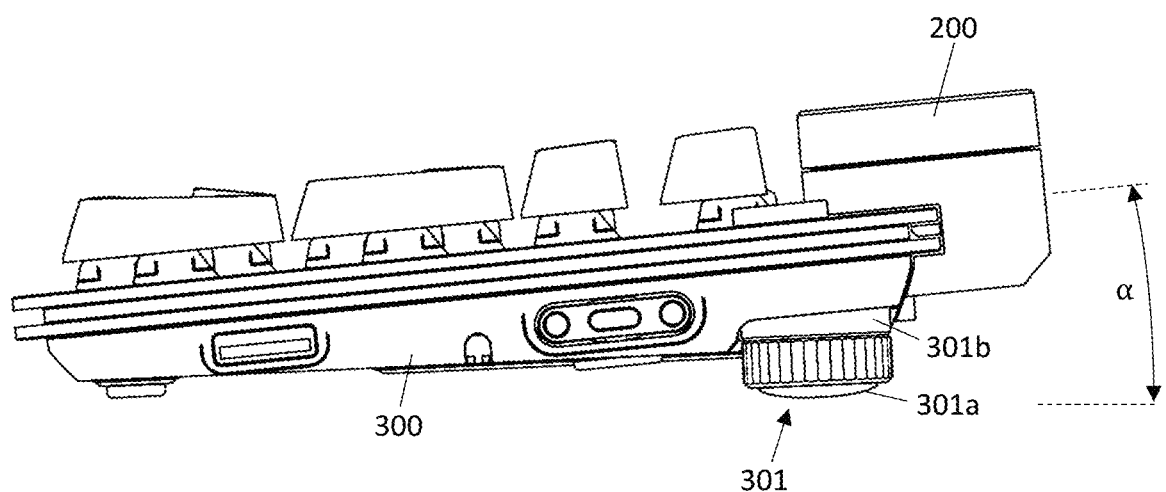
FIG. 18 schematically depicts a side view of the combination of FIG. 16 at a second tilt angle of the keyboard.
Figure 19:
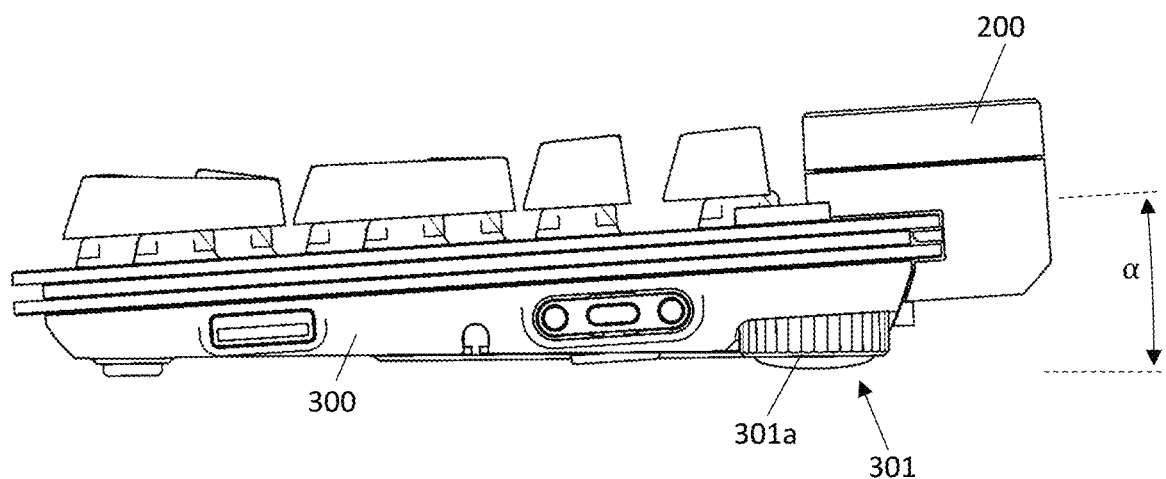
FIG. 19 schematically depicts a side view of the combination of FIG. 16 at a third tilt angle of the keyboard.

FIG. 16 to FIG. 19 schematically depict an embodiment of a combination of a keyboard 300 and two sets of support elements 301, 302 according to the invention. FIG. 16 depicts an exploded perspective view, while FIGS. 17-19 depict side views with the keyboard at different tilt angles as will be explained below in more detail.

The keyboard 300 is an example of an input device. In this example, the combination includes two sets of support elements, wherein a first set of support elements is denoted using reference numeral 301 and a second set of support elements is denoted using reference numeral 302. Both sets of support elements have been depicted in exploded view to clearly indicate the different support elements.

Each set of support elements 301, 302 includes in this embodiment three support elements of which one support element is of a type "a" and the other two support elements are of a type "b", which support elements are denoted using a reference numeral starting with the reference numeral of the corresponding set of support elements followed by the letter indicating their type, e.g. support element 302b is part of the second set of support elements and of type "b".

The keyboard 300 in this embodiment includes an attachment location 300.1, 300.2 per set of support elements 301, 302. The attachment locations 300.1, 300.2 are arranged at the bottom of the keyboard near the backside at the two corners. An advantage of the two attachment locations at a distance from each other is that they are able to provide a stable support for the keyboard. However, it is also possible to use a single set of support elements at a center of the back side in between the current attachment locations.

The attachment locations 300.1, 300.2 are recognizable by a circular-shaped protrusion that is configured to mate with a corresponding recess in one of the support elements. However, other shapes of the protrusion and recess are also envisaged.

Type "b" support elements in this embodiment are characterized by having a recess at one side to mate with a protrusion of another support element or the protrusion at the attachment location, and by having a protrusion at an opposite side to mate with a recess of another support element.

Type "a" support elements in this embodiment are characterized by having a recess at one side to mate with a protrusion of another support element or the protrusion at the attachment location, and by having an engagement surface at an opposite side to engage with a support surface such as a table top surface.

The recesses of the type "a" and type "b" support elements are preferably identical or at least similar to each other, and/or the protrusions of the type "b" support elements and the protrusion of the attachment location are preferably identical or at least similar to each other. An advantage thereof is that the support elements of a set of support elements can easily be stacked with minimal requirements on the number of and the order of the support elements.

The combination includes fasteners to fasten any number of support elements of each set of support elements to the keyboard 300. In this example, the fasteners include at least one permanent magnet per set of support elements. Permanent magnets have the advantage that fastening can be done quickly and easily. One of the following configurations of the fasteners may be used:
A) a single permanent magnet in the protrusion at the attachment location and magnetizable material, e.g. ferromagnetic material, in all support elements;
B) a single permanent magnet in the type "a" support element and magnetizable material, e.g. ferromagnetic material, in the type "b" support elements and the protrusion at the attachment location;
C) a permanent magnet in each support element and magnetizable material, e.g. ferromagnetic material, in the protrusion of the attachment location and possibly in one or more support elements; or
D) a permanent magnet in each support element and in the protrusion of the attachment location.

The set of support elements and the fasteners are configured to allow any number of support elements to be fastened to the keyboard 300 to set different tilt angles of the keyboard 300. In case of three support elements in a set of support element as in this embodiment, the fasteners preferably allow to fasten one, two of three support elements to the keyboard as will be explained below by reference to the FIGS. 17-19.

FIG. 17 schematically depicts a side view of the combination of the keyboard 300 and the first set of support elements 301 with all support elements 301a, 301b forming a stack of three support elements and being fastened to the keyboard thereby setting a maximum tilt angle α of the keyboard 300.

FIG. 18 schematically depicts a side view of the combination of the keyboard 300 and the first set of support elements 301 with a support element 301a and a support element 301b forming a stack of two support elements and being fastened to the keyboard thereby setting an intermediate tilt angle α of the keyboard 300 that is smaller than the maximum tilt angle in FIG. 17.

FIG. 19 schematically depicts a side view of the combination of the keyboard 300 and the first set of support elements 301 with only support element 301a being fastened to the keyboard thereby setting a minimum tilt angle α of the keyboard 300 that is smaller than the intermediate tilt angle of FIG. 18.

A difference between adjacent tilt angles may be in the range 1-3 degrees, preferably in the range 1.5-2.5 degrees, e.g. 2 degrees.

Although in this embodiment, permanent magnets are used, other type of fastening means may also be used, e.g. snap-fit connectors, Velcro, bayonet connection or a simple bolt.

Although each set of support elements in this embodiment comprises three support elements, it is also possible to use two, four or five support elements in a set of support elements.

Although in this embodiment, the number of support elements is equal to the number of tilt angles to be set, it is also possible in another embodiment, to use a set of support elements with two support elements, wherein one support element is thicker than the other support element, so that with two support elements, three different tilt angles can be set, namely, a first tilt angle defined by the thin support element, a second tilt angle defined by the thick support element, and a third tilt angle defined by the stack of both support elements. It is envisaged that this principle can be extended to a set of support elements with more than two support elements by having at least one support element with a different thickness than other support elements.

In the embodiment of FIGS. 16-19, always the type "a" support element engages with a support surface independent of the situation. This has the advantage that the type "a" support element can be specifically designed for engagement with the support surface, e.g. by including a foot, for instance a rubber foot, and that the other support elements do not need such a specifically designed foot.

In this embodiment, the type "a" support element includes grooves on its outer surface to allow easy manual manipulation of this support element.

In this embodiment, the protrusions and recesses in the support element allow to align the support elements within a stack. Such alignment is not necessary per se and may also be obtained in different ways, e.g. when a bolt is used as fastener and the support elements have a bore to receive the bolt.

It will be apparent to the skilled person that the embodiment of FIGS. 16-19 may be combined with embodiment of FIGS. 1-15. To illustrate this, feet 310 in FIGS. 2 and 7 may be embodied as a set of support elements and an extension unit 200 similar to the extension unit 200 in FIGS. 9-14 is depicted in FIGS. 17-19.

The invention claimed is:
1. An input device for a separate computing device and a set of support elements, wherein the set of support elements includes at least two support elements, wherein the combination includes fasteners to fasten any number of support elements of the set of support elements to the input device, wherein the fasteners include at least one permanent magnet and magnetizable material, wherein the support elements are fastenable to the input device at a location on the input device to set a tilt angle of the input device, wherein the location on the input device has a protrusion or recess to mate with a corresponding recess or protrusion of a support element, and wherein the set of support elements is configured such that a single support element can be fastened to the input device and such that a plurality of support elements can be fastened to the input device as a stack of support elements thereby allowing to set different tilt angles of the input device, wherein the set of support elements comprises a support element of type "a" which is configured to engage with a support surface, wherein the set of support elements comprises at least one support element of type "b" configured to be arranged in the stack of support elements between the input device and the support element of type "a", wherein the type "b" support elements have a recess at one side to mate with a protrusion of another support element or a protrusion at the location on the input device, and a protrusion at the opposite side to mate with a recess of another support element or a recess at the location on the input device, wherein the type "a" support elements have a recess or protrusion at one side to mate with a protrusion or recess of another support element or the protrusion or recess at the location on the input device, and an engagement surface at an opposite side to engage with the support surface, and wherein the location on the input device and each support element are provided with a permanent magnet and/or magnetizable material to fasten the support elements to the location on the input device.

2. An input device according to claim 1, wherein the input device is a keyboard or an extension unit for a keyboard.

3. An input device according to claim 1, wherein the set of support elements is a first set of support elements and the fasteners are first fasteners, wherein the combination further includes a second set of support elements, wherein the second set of support elements includes at least two support elements, wherein the combination includes second fasteners to fasten any number of support elements of the second set of support elements to the input device, wherein the support elements of the second set of support elements are fastenable to the input device at a location on the input device to set a tilt angle of the input device, and wherein the second set of support elements is configured such that a single support element can be fastened to the input device and such that a plurality of support elements can be fastened to the input device as a stack of support elements thereby allowing to set different tilt angles of the input device using the first and second set of support elements.

4. An input device according to claim 1, wherein the input device includes an attachment location per set of support elements.

5. An input device according to claim 1, wherein the input device is configured to be connected to the computing device via a wire or wirelessly.

6. An input device according to claim 1, wherein the set of support elements has at least two support elements with at least one support element having a different thickness than other support elements.

7. An input device according to claim 1, wherein a difference between tilt angles is in the range 1-3 degrees.

8. A set of support elements for an input device for a separate computing device, wherein the set of support elements includes at least two support elements and fasteners to fasten any number of support elements of the set of support elements to the input device, wherein the fasteners include at least one permanent magnet magnetizable material, wherein the support elements are fastenable to the input device at a location on the input device to set a tilt angle of the input device, and wherein the set of support elements is configured such that a single support element can be fastened to the input device and such that a plurality of support elements can be fastened to the input device as a stack of support elements thereby allowing to set different tilt angles of the input device, wherein the set of support elements comprises a support element of type "a" which is configured to engage with a support surface, wherein the set of support elements comprises at least one support element of type "b" configured to be arranged in the stack of support elements between the input device and the support element of type "a", wherein the type "b" support elements have a recess at one side to mate with a protrusion of another support element or a protrusion at the location on the input device, and a protrusion at the opposite side to mate with a recess of another support element or a recess at the location on the input device, wherein the type "a" support elements have a recess or protrusion at one side to mate with a protrusion or recess of another support element or the protrusion or recess at the location on the input device, and an engagement surface at an opposite side to engage with the support surface, and wherein the location on the input device and each support element are provided with a permanent magnet and/or magnetizable material to fasten the support elements to the location on the input device.

\* \* \* \* \*